United States Patent [19]

DeRosa

[11] Patent Number: 5,326,118
[45] Date of Patent: Jul. 5, 1994

[54] LIMITED TILT UNICYCLE

[75] Inventor: Richard DeRosa, Hopatcong, N.J.

[73] Assignee: Research & Design Studio, Inc., Hopatcong, N.J.

[21] Appl. No.: 970,277

[22] Filed: Nov. 2, 1992

Related U.S. Application Data

[63] Continuation-in-part of Ser. No. 636,134, Dec. 31, 1990, abandoned.

[51] Int. Cl.[5] .................................................. B62K 1/00
[52] U.S. Cl. ............................... 280/205; 280/221;
280/259; 446/448; 482/66; D21/194
[58] Field of Search ............... 280/205, 211, 221, 259;
446/237, 431, 448; 482/66; D21/194

[56] References Cited

U.S. PATENT DOCUMENTS

| | | | |
|---|---|---|---|
| D. 216,817 | 3/1970 | Purdy | D21/194 |
| 242,161 | 5/1881 | Scuri | 280/205 |
| 246,031 | 8/1881 | Otto | 280/205 |
| D. 289,985 | 5/1987 | Davenport | D12/107 |
| 550,399 | 11/1895 | Anderson | 280/205 |
| 663,295 | 4/1900 | Neubert | 280/208 |
| 2,198,857 | 4/1940 | Branson | 280/11.24 |
| 2,920,904 | 1/1960 | Doud et al. | 280/205 |
| 2,971,773 | 2/1961 | McKissick | 280/205 |
| 3,083,036 | 3/1963 | Cornell, III et al. | 280/205 |
| 3,107,926 | 11/1963 | Verge | 280/221 |
| 3,190,675 | 6/1965 | Tang | 280/221 |
| 3,304,098 | 2/1967 | Sloan et al. | 280/221 |
| 3,306,627 | 2/1967 | Goto | 280/259 |
| 3,318,614 | 5/1967 | Lee | 280/221 |
| 3,437,351 | 4/1969 | Newbern | 280/205 |
| 3,506,283 | 4/1970 | Tang | 280/221 |
| 3,663,031 | 5/1972 | Young | 280/11.24 |
| 4,150,667 | 4/1979 | Takeuchi | 482/57 |
| 4,241,931 | 12/1980 | Healy | 280/205 |
| 4,324,413 | 4/1982 | Bensette et al. | 280/205 |
| 4,515,382 | 5/1985 | Boese | 280/221 |
| 4,740,001 | 4/1988 | Torleumke | 280/11.115 |
| 4,786,067 | 11/1988 | Tang | 280/221 |
| 4,786,068 | 11/1988 | Tang | 280/221 |
| 4,786,069 | 11/1988 | Tang | 280/221 |
| 4,915,375 | 4/1990 | Ginsburg | 280/294 |
| 4,973,071 | 11/1990 | Ishizaki | 280/208 |
| 5,002,295 | 3/1991 | Lin | 280/205 |
| 5,011,171 | 4/1991 | Cook | 280/221 |

FOREIGN PATENT DOCUMENTS

991173 5/1965 United Kingdom .

*Primary Examiner*—Margaret A. Focarino
*Assistant Examiner*—Kevin Hurley

[57] ABSTRACT

A unicycle includes a center wheel with two diametrically opposed pedals. Each pedal has a tilt limiting ground contactor such as a wheel or ball affixed to the free end. The ground contactor contacts the ground at the lowest point of pedal travel if the tilt limit is exceeded.

14 Claims, 6 Drawing Sheets

LIMITED TILT UNICYCLE

CROSS REFERENCE TO RELATED APPLICATION

This application is a continuation-in-part of applicant's copending U.S. application Ser. No. 07/636,134, filed Dec. 31, 1990 now abandoned.

FIELD OF THE INVENTION

The present invention relates to unicycles, and more particularly to a unicycle having tilt limiters to prevent tilting beyond a selected angle of inclination relative to the ground.

DESCRIPTION OF THE PRIOR ART

Unicycles have a long history and a variety of designs have been proposed over the years. One traditional unicycle design is exemplified by U.S. Pat. No. 3,083,036, issued Mar. 26, 1963 to D. E. Cornell III, et al., which utilizes a single central wheel with a pair of crank arms projecting from and rigidly coupled to an axle disposed on the axis of rotation of the wheel. The crank arms are disposed on opposite sides of the central wheel at an angular offset about the axis of rotation of 180 degrees relative to each other and have a pair of pedals rotatably affixed at either of their free ends upon which the feet of the user are placed. A seat is supported upon a forked frame which is rotatably attached to the center wheel axle. As can be appreciated from the foregoing patent, the traditional unicycle is quite challenging to use and requires great skill to prevent the cycle from tipping to either side, while at the same time transferring one's weight through the forked frame to the center wheel axle without letting it pivot too far forward or backward. Of course, to "ride" the unicycle one must do all these things simultaneously while pedalling to induce forward/rearward motion and steering the cycle in the proper direction. It should be observed that the unicycle is, in its most simple form, a "pedalled wheel". As such, there is a one-to-one correspondence between complete rotations of the crank arms and the wheel which is "pedalled". A desirable attribute of the unicycle which is related to the undesirable attribute of difficulty in riding one is that it has almost total freedom of motion. That is, a skilled rider may pedal forward, backward, turn in any direction and even spin in one spot.

The difficulty in riding unicycles has been addressed by a number of prior devices, most if not all, being attempts to stabilize the unicycle by restraining or limiting at least one range of motion. For example, U.S. Pat. No. 3,107,926 issued Oct. 22, 1963 to C. B. Verge utilizes a pair of outer wheels affixed to the free ends of the pedals of the center wheel to prevent the center wheel from tipping. The outer wheels are equal in diameter to the center wheel and are in constant contact with the ground during use of the cycle. In addition to his three wheeled version, Verge also disclosed a cycle in which the center wheel is removed, such that only a crankshaft connecting a pair of two parallel, equal-diameter wheels remains. U.S. Pat. Nos. 4,973,071 to Ishizaki, 4,515,382 to Boese, 3,318,614 to Lee, 3,304.098 to Sloan, and Des. 216,817 to Purdy all disclose similar arrangements. In each case, the multiple wheels of the resultant cycle increase stability from tipping sideways but constrain the freedom of motion of the cycle to that of a rolling cylinder (as defined by the spaced parallel wheel disks). Thus, a desirable attribute of unicycles is lost, viz., the ability to steer the cycle by tilting. It should be observed that the patents discussed above have eliminated the seat which is pivotally supported upon the center wheel axle as disclosed, e.g., by Cornell III, and are therefore cycles which are operated by standing, rather than sitting, riders.

Similar observations can be made with respect to certain patents to Chun-Yi Tang, viz., U.S. Pat. Nos. 3,190,675, 3,506,283, 4,786,067, 4,786,068 and 4,786,069, which all relate to cycles having a drum-shaped center wheel. Tang's drum-shaped wheel has a width of about ¼ to ½ the diameter of the wheel. Tang also discloses a cycle where the drum is comprised of a pair of disks separated by spacers. For this reason, the patents to Tang relate to devices which have the inherent steering qualities of a rolling cylinder. Tang suggests in U.S. Pat. No. 3,190,675 that the drum wheel may be steered by tipping it, so that only one edge is in contact with the ground, then redirecting the cycle by shifting body weight. In this manner, the tendency to roll in a straight line inherent to a cylinder can be overcome, however, only at the bottom of pedal travel. Tang '675 further suggests that conventional, bicycle-type, rotatable pedals attached to the drum may serve as tilt limiters when tipping the drum as the rider executes a turning maneuver. The Tang devices with drum-shaped center wheel all require the rider's legs to be spread apart sufficiently to straddle the width of the drum, which is suggested as being about, e.g., 8 inches. As can be imagined, there are certain persons who might find this device uncomfortable to use, e.g., one could expect that a rider's legs would collide with the adjacent edge of the drum during use.

U.S. Pat. No. 5,011,171 to Cook teaches a three wheeled cycle wherein two outer wheels are smaller in diameter than a central wheel. The central wheel has a unicycle configuration with offset pedals to which the outer wheels attach such that they rotate coaxially with the center wheel. In this manner, the outer wheels serve as "training wheels" which permit a limited degree of tilt of the center wheel such that turns may be executed. The patent to Cook thus describes a cycle which has the rolling and turning characteristics of a pair of regular cones which are assembled together at their largest diameters, i.e., as defined by the large central wheel and the two outer coaxial wheels.

The known prior art therefore does not include a stabilized unicycle having a conventional disk-like central wheel which permits a large degree of tilt throughout the majority of the cycle of rotation of the central wheel and thereby enables the cycle to be turned like a traditional unicycle. The prior art is also devoid of a unicycle design which reestablishes a vertical orientation of the central wheel relative to the ground, periodically, during rotation of the center wheel. The prior art also fails to teach a unicycle having center wheel tilt limiters which are specially designed and adapted to contact the ground on a periodic basis. It is therefore an object of the present invention to provide a unicycle having these features.

SUMMARY OF THE INVENTION

The problems and disadvantages associated with the conventional unicycles are overcome by the present invention which includes a unicycle having a wheel with first and second foot supports attached thereto and extending substantially at right angles from opposite sides of the wheel in diametric opposition. Each foot support has a tilt limiter associated therewith for intermittently limiting the angle of tilt of the wheel relative to the ground via ground contact.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
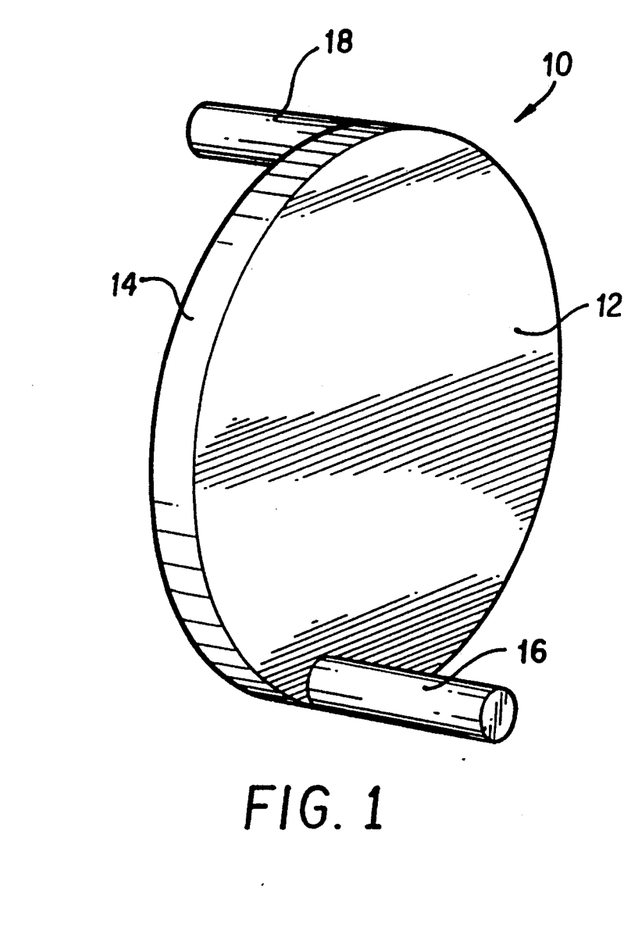
FIG. 1 is a perspective view of a first exemplary embodiment of the present invention.

FIG. 1 shows a unicycle 10 in accordance with the present invention which includes a disk-shaped center wheel 12 which is depicted in an upright, vertical position. The wheel 12 has an outer peripheral surface 14 which contacts the ground during use. A pair of pedals 16, 18 project at right angles, i.e., horizontally as depicted, from the surface of the wheel 12 on opposite sides thereof at a 180 degree offset relative to each other, i.e., diametrically opposed. The pedals are located proximate the periphery of the wheel such that a portion thereof is coextensive with the outer peripheral surface 14 of the wheel 12. If the unicycle is placed upon a flat reference surface with a pedal, e.g., 16 proximate the surface and the center wheel 12 held substantially at right angles to the surface, both the outer peripheral surface 14 and at least one point of the pedal 16 will contact the surface. In the embodiment depicted in FIG. 1, the pedals 16, 18 are rigidly secured to the center wheel 12 and are therefore cylindrical in shape to permit rotation relative to the feet of the rider. The pedals 16, 18 can also be rotatably mounted to the center wheel 12. Other forms of pedals and attachments are contemplated by the present invention as shall be discussed below. As can be seen in FIG. 1, the center wheel 12 of the present invention is preferably disk-shaped, e.g., the width of the wheel 12 should be less than one-quarter the diameter. As discussed above, while a wider center wheel 12 results in greater stability against tilting, maneuverability (steering) is compromised and collisions of the wheel with the rider's legs during use are more probable.

The center wheel 12 may be made of any mechanically sturdy material, such as plastic, wood, metal, pressed or composite material, etc., having sufficient strength to support the expected weight of the rider and the stresses encountered in use. The pedals can be made of similar materials, however, it should be noted that if a relatively structurally weak material is used, the pedals must have a rather large cross-sectional area to prevent bending under the weight of the rider. The pedals 16, 18 may be attached by bolts, by press fitting into suitable bores in the wheel 12, formed monolithically with the wheel (if molded from plastic) or in any other manner as should be within the scope of knowledge of the normally skilled artisan.

As would be expected, the pedals 16, 18 receive the feet of a rider, support his weight and transfer that weight to the wheel 12. At the point in the rotational cycle of the unicycle 10 where the pedals 16, 18 contact the support surface, i.e., "ground" some portion of the rider's weight is transferred directly through the pedals to the ground. As used hereinafter, "ground" shall mean any support surface, such as a floor, pavement, sidewalk, lawn, etc., upon which the unicycle may be operated. As in all pedalled devices, the unicycle 10 is set into motion by the shifting of the rider's weight from one pedal 16, 18 to the other in the direction of travel. As in traditional unicycles, the present invention is steered by tilting the wheel 12 by a shifting of the rider's weight in a direction perpendicular to the line of travel, i.e. from one side to the other. There are, however, several significant differences between the operation of the present invention and known devices. For example, a rider can position himself for use of the unicycle 10 by placing one of the pedals in ground contact. The unicycle can then be mounted by the rider by his placing his entire weight upon that pedal which is in contact with the ground. As can be appreciated, this is a very stable position and permits the rider to place his other foot upon the pedal which is distal to the ground. When one of the pedals is in contact with the ground, supporting the rider's weight, the center wheel is positioned at right angles to the ground, i.e., correctly oriented for riding by executing a pedalled stroke. Thus, the rider can start to ride the unicycle 10 from a stable standing position unlike a conventional unicycle which requires the rider to maintain a dynamic state of balance as soon as both feet are placed upon the cycle. While riding a unicycle 10 in accordance with the present invention as shown in FIG. 1, each of the pedals 16, 18 contact the ground at their lowest point of travel during each cycle of rotation (two contacts for each full rotation of the wheel 12). When the pedals 16, 18 contact the ground they re-establish a vertical orientation of the center wheel 12 relative to the ground and in this manner correct out of balance operation. The contact of the pedals with the ground coordinates with the natural tendency of a rider to lower his foot in the direction of fall to maintain balance. Thus the foot that is lowered brings the corresponding pedal into stabilizing ground engaging contact. At the lowest pedal position, the rider may place his entire weight upon the pedal without tipping the unicycle and is essentially allowed to "start over" as each pedal contacts the ground.

While the pedals 16, 18 contact the ground at their lowest positions, once beyond those positions the center wheel 12 is essentially free to tilt like a traditional unicycle so that complete steering control and maneuverability is available. Even when the pedals 16, 18 are in contact with the ground, the rider's weight may be shifted such that the unicycle can be pivoted upon the contact points. For the foregoing reasons, the present invention, unlike other tilt limited unicycles, is easier to use and learn to ride while retaining almost all of the function and range of motion of traditional unicycles.

Figure 2:
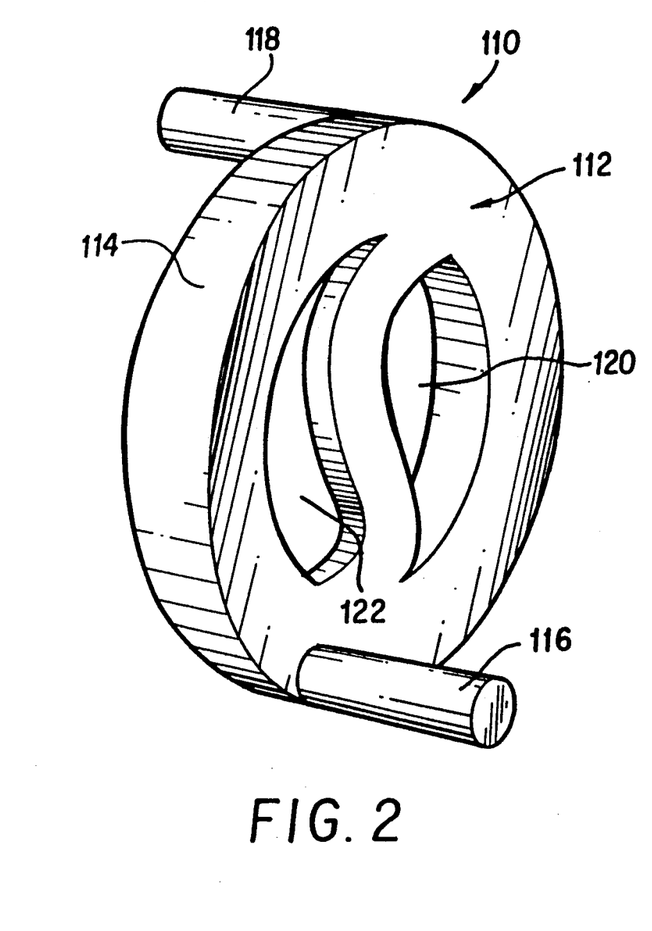
FIG. 2 is a perspective view of a second exemplary embodiment of the present invention.
Figure 3:
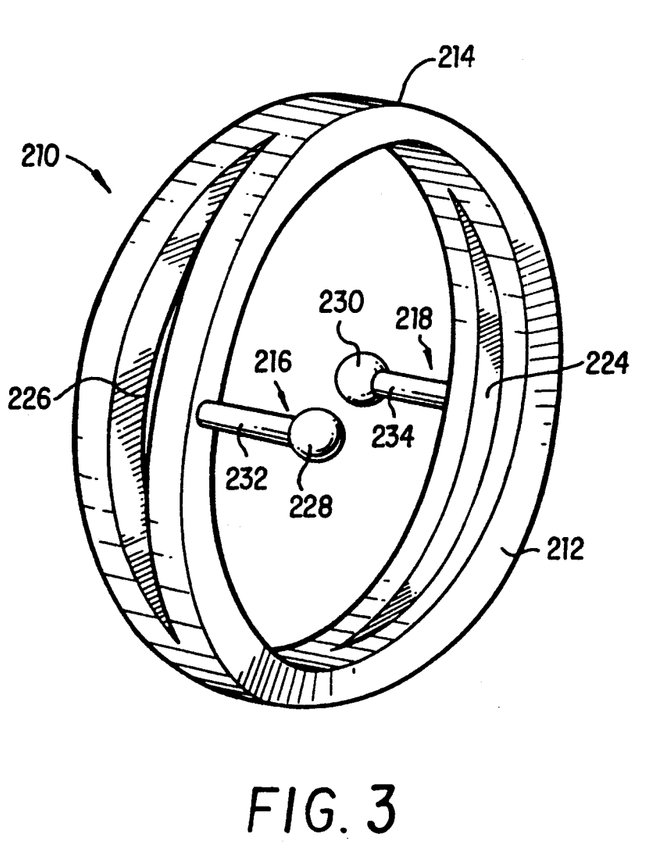
FIG. 3 is a perspective view of a third exemplary embodiment of the present invention.

In the description of the remaining figures, corresponding elements shall be designated with the same reference numbers incremented by 100 for each succeeding figure. Corresponding elements have the same structure and function unless otherwise depicted or noted. FIG. 2 shows an embodiment of the present invention in which the width of the outer peripheral surface 114 varies around the perimeter of the wheel 112 such that the wheel 112 is narrow proximate the pedals 116, 118 and wider in the area ninety degrees removed therefrom. Since the width of the wheel is a factor contributing to its stability and maneuverability, FIG. 2 illustrates that these parameters can be varied depending upon the degree of rotation of the wheel 112 by varying wheel 112 width and/or peripheral surface area 114. In this manner, the wheel 112 may be stabilized by being made thicker at those degrees of rotation requiring greater stability and thinned to provide greater maneuverability in those areas where stability is not as important. The critical degrees of instability/maneuverability may vary depending upon the individual rider, so that at least two versions of the apparatus may be provided, e.g., as shown in FIG. 2 and as shown in FIG. 3 where the wider section is proximate the pedals. In the alternative, a plurality of diametrically opposed holes or other pedal mounting means may be provided in the wheel to accommodate the pedals in a variety of locations. This would permit the rider to position the pedals relative the thick and thin portions of the wheel 112 which best suits him. As an alternative to a wheel 112 having varying thickness, independent, removeable plates, e.g., formed from sheet metal or plastic, could be affixed by bolts or other means to the sides of the wheel 112 to produce a removeable flaring of wheel width. The removeable plates could be adjustable in that they could be rotated relative to the pedal low points to create a flared wheel portion where the rider desires it. FIG. 2 also illustrates that the present invention may have a wheel 112 which has openings therein as shown at reference numerals 120 and 122. An aperture or apertures such as 120 and 122 may be provided in the central region of the wheel 112 to reduce the weight and/or wind resistance or to embody an attractive aesthetic design. The aperture(s) may be adapted to store or hold personal items, a radio or tape player. In the event that a backpack is used to carry the unicycle 110, the backpack can be stored in a suitable receptacle installed within an aperture in the wheel 112.

FIG. 3 illustrates that the present invention can have a wheel 212 which is tapered in width such that the widest portion of the outer peripheral surface 214 is proximate to the pedals 216, 218, as discussed above. In FIG. 3 the wheel 212 is generally in the shape of a rim or ring which is partially split by two slits 224, 226 proximate the pedals 216, 218. As this embodiment suggests, the present invention could be fabricated by welding metal rings or tubes into the desired shape. The pedals 216, 218 include a spheric ground contactor 228, 230 which is designed such that when the pedal is closest the ground and the wheel 212 is vertical, at least the lowest point on the contactor will be touching the ground. As a consequence of the presence of the contactors 228, 230, the pedals 216, 218 may now be viewed as having shaft portions 232, 234 which space the bottom of the rider's foot above the ground and which are not themselves intended to contact the ground. As can readily be appreciated, the smooth outer surface of the spheric contactors 228, 230 decrease the likelihood that a pedal 216, 218 will jamb or jab into the ground during use. In addition, the spheric configuration of the contactors is thought to render the pedals less prone to injure the rider in the event of a fall. As an alternative, the contractors 228, 230 may be rotatably attached to the shaft portions 232, 234.

Figure 4:
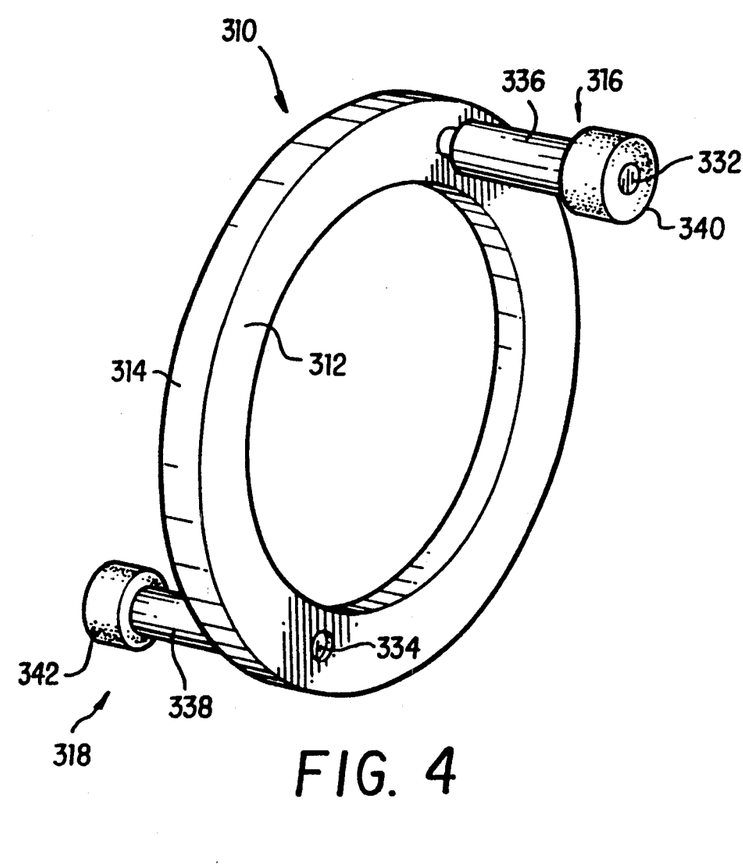
FIG. 4 is a perspective view of a fourth exemplary embodiment of the present invention.

FIG. 4 shows a ring-shaped wheel 312 with pedals 316, 318 each having two independently rotatable portions: a rotatable foot support 336, 338, respectively, and a rotatable pedal wheel 340, 342, respectively, installed upon the respective pedal shafts 332, 334. The rotatable foot supports 336, 338 prevent the feet of the rider from directly bearing upon the pedal shafts 332, 334 and may be specially adapted for slideable rotation about the shafts 332, 334 such as by the provision of bearings or bearing materials, friction reducing plastics, etc. The pedal wheels 340, 342 are preferably adapted to turn freely on the shafts 332, 334 via similar expedients. The outer periphery of each pedal wheel 340, 342 is coextensive with the outer peripheral surface 314 at at least one point such that when the pedal is at its lowest point and the wheel 312 is vertical, the pedal wheel, e.g., 340 will just contact the ground. This provides the benefit that any sliding friction encountered by a pedal like those shown in the preceding figures will be reduced to rolling friction which will reduce drag and interruption of the pedalling cycle. The configuration also allows a rider to stand in place with a foot on one pedal and position the cycle in a desired direction before bringing the other foot off the ground to begin pedalling. The rider can also spin the cycle in one spot with the rider's weight on the lowered pedal. The pedals wheels 340, 342 may be removeable such that an alternative ground contactor like the spheric contactors 228, 230 shown in FIG. 3 may installed, as suits the rider's preference. As a further alternative, a rotatable pedal wheel may be supplied with an adjustable friction drag, e.g., a nut and washer retaining the wheel on its axle, as is known in the art, such that the freedom of movement of the pedal wheel can be varied from a locked condition to a freely moveable one. This would allow the rider to effectively convert a rotatable pedal wheel to a stationary ground contactor. In any event, it is preferable on cycles with less than 90 degree tilt limiters to have an arcuate ground contacting surface. Of course a number of alternative ground contacting surface shapes exist.

Figure 5:
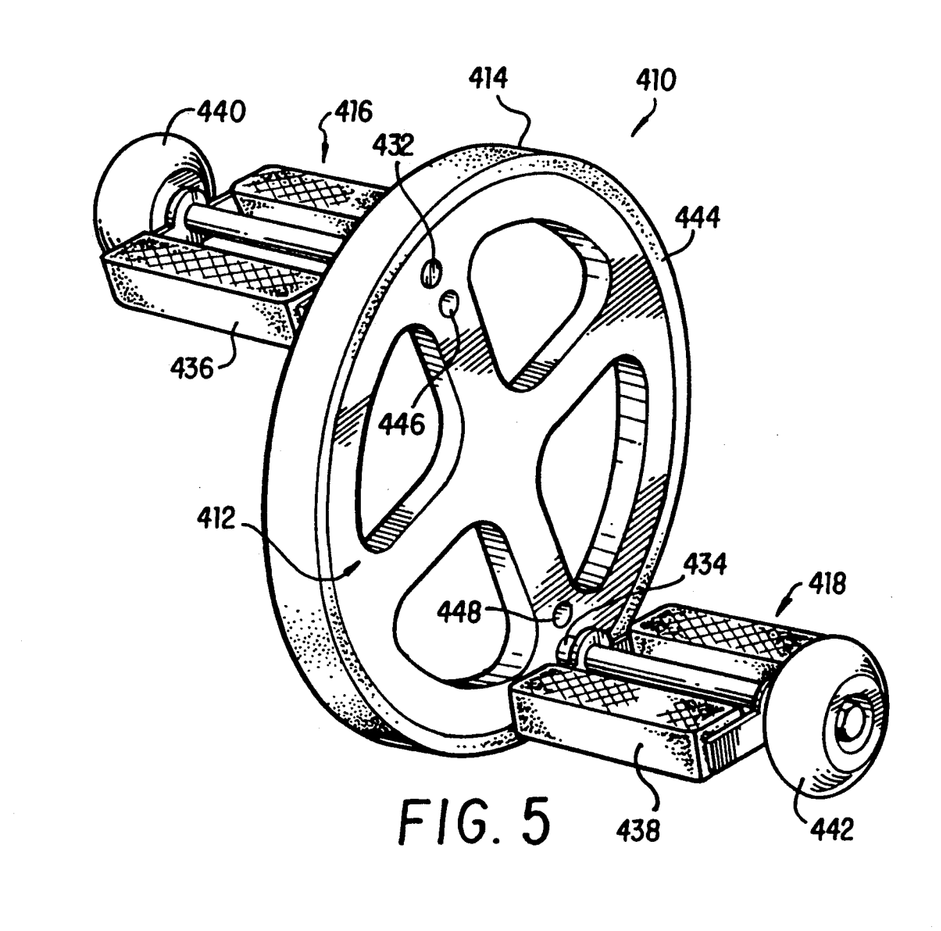
FIG. 5 is a perspective view of a fifth exemplary embodiment of the present invention.

FIG. 5 shows a unicycle 410 in accordance with the present invention which incorporates resilient material 444 to form the outer peripheral surface 414 of the wheel 412. The resilient material 444 may be a rubber, plastic, foam or leather, etc. layer which is adhered to the center wheel 412 by glue or other conventional means and achieves the familiar objectives of a cushioned ride and increased frictional hold upon the supporting surface. The resilient material may be an inflatable tire 544 as shown in FIG. 7. In FIG. 5, the center wheel 412 includes an extra pair of holes 446, 448 for receiving the pedal shafts 432, 434 and allow the pedals 416, 418 to be reinstalled closer towards the axis of the wheel 412, the effect of which will be discussed in conjunction with a description of FIG. 6. Alternatively, a slide and lock, as is known in the art, may be utilized to allow repositioning of the pedals without removing the shafts from the frame. The rotatable foot supports 436, 438 are of a type as would be encountered on the common bicycle. The pedal wheels 440, 442 have a more elongated end-view profile than those illustrated in FIG. 4, but like the embodiment depicted in FIG. 4, the pedal wheels 440, 442 are rotatable about the axis of the pedal shafts 432, 434. The pedal wheels 440, 442 may be made of materials as are commonly used to make roller skate and skate board wheels.

Figure 6:
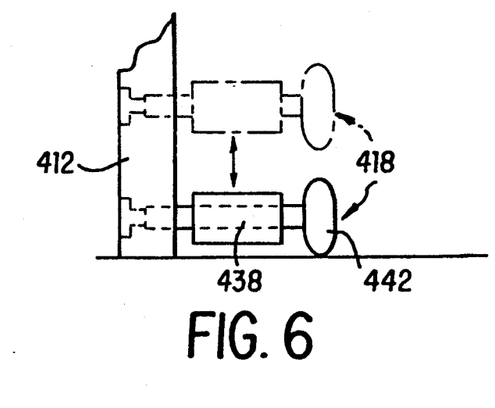
FIG. 6 is an elevational view of a lower portion of the center wheel of the device shown in FIG. 5 with an alternative pedal position illustrated in phantom form.
Figure 7:
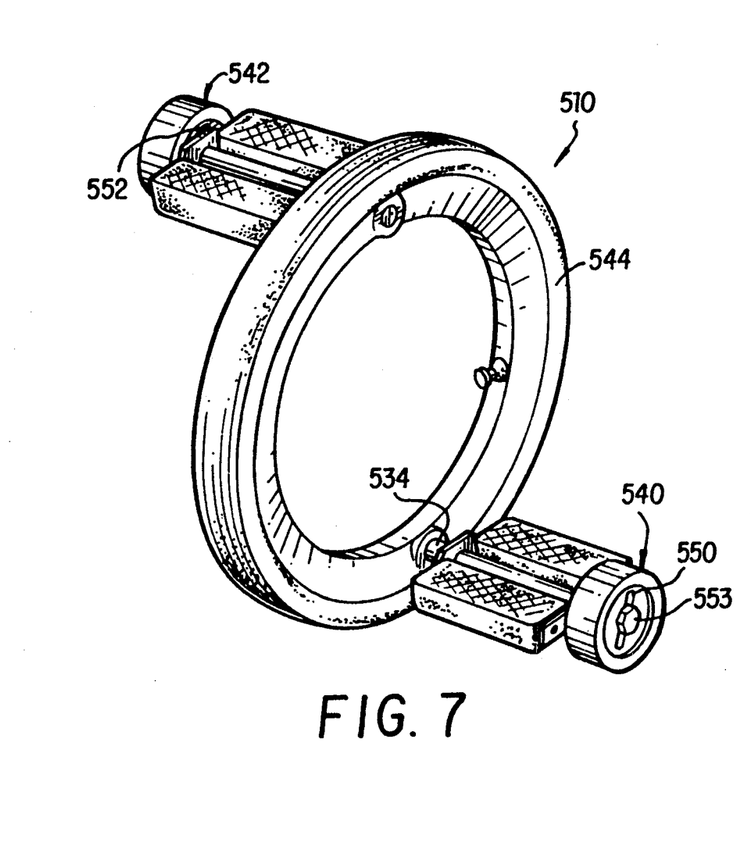
FIG. 7 is a perspective view of a sixth exemplary embodiment of the present invention.

FIG. 6 illustrates the effect of moving the pedal 418 inwardly, viz., that the pedal 418 (pedal wheel 442) is removed from contact with the ground when the center wheel 412 is vertical. In this manner, the present invention is made to approximate more closely the conventional unicycle. It continues to differ therefrom, however, due to the fact that the degree of tilt of the center wheel 412 is limited to a selected predetermined angle of tilt as determined periodically by a specialized ground contactor affixed to the end of the pedal, which, in the case illustrated, is a rotatable wheel. The adjustable pedal height discussed allows a rider to alter the unicycle to match his skill level. The same effect can be achieved by removing pedal wheels and replacing them with wheels of greater or lesser diameter without moving the pedal shaft relative to the center wheel.

FIG. 7 shows a unicycle 510 having a different combination of features as shown in embodiments previously discussed and with an inflatable tire as the resilient material 544. Alternatively, the time 544 could be semi-pneumatic or foam filled such that an air valve would not be required. The pedal wheels 540, 542 have slots 550, 552 to permit the wheels 540, 542 to be repositioned to limit tilt to a selected angle. In the embodiment shown, a bolt or nut, e.g., 553 threadedly engaged with the pedal shaft 534 releaseably secures the wheel 540 in the position selected in order to allow the unicycle to be fine tuned to the individual rider.

Figure 8:
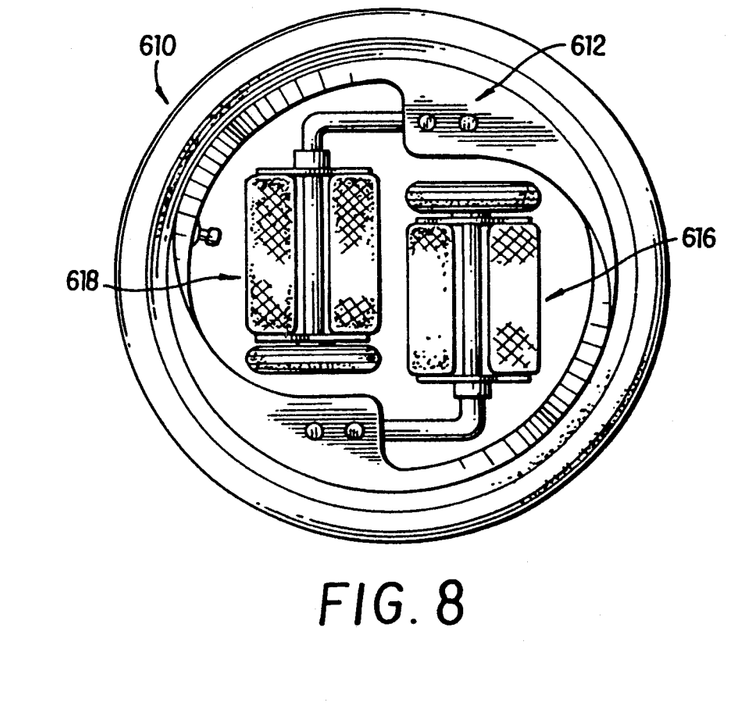
FIG. 8 is a perspective view of a seventh exemplary embodiment of the present invention.

FIG. 8 shows that the pedals 616, 618 may be pivotally secured to the center wheel 612 such that they can assume an extended operational position and a retracted storage position wherein the overall exterior dimensions of the unicycle 610 are reduced. As depicted, the pedals 616, 618 are retracted to facilitate transport and storage.

Figure 9:
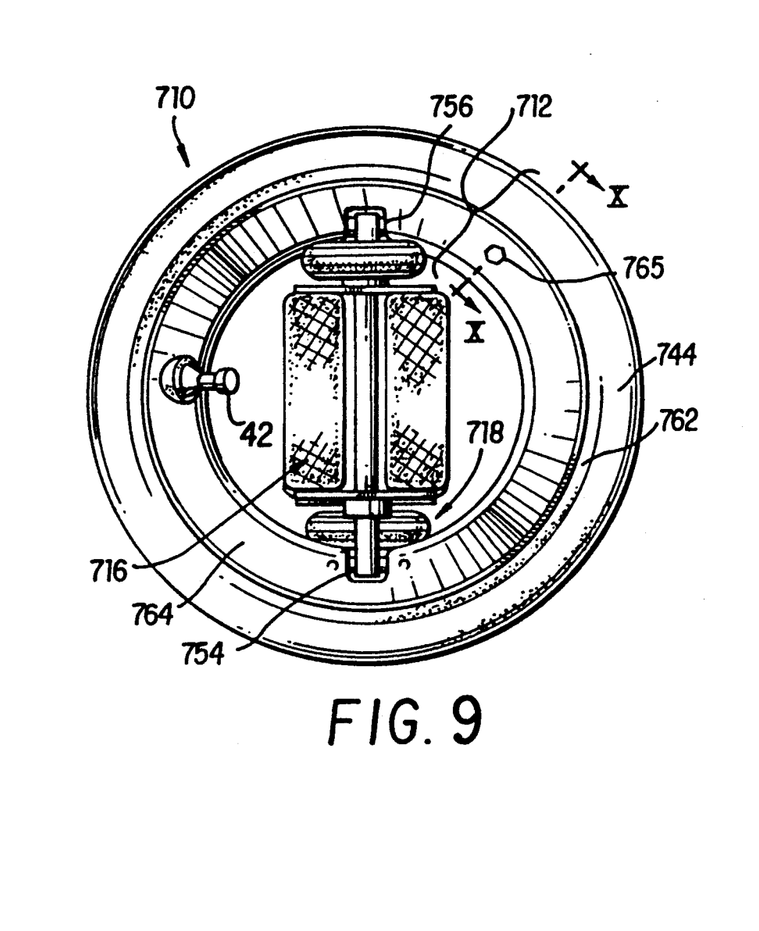
FIG. 9 is a perspective view of an eighth exemplary embodiment of the present invention.

FIG. 9 illustrates a unicycle 710 having retractable pedals 716, 718 which pivot upon pivot pins 754, 756. Unicycle 710 also includes a unidirectional clutch which permits an outer rim 762 with tire 744 to freewheel in one rotary direction and turn conjointly with an inner wheel 764 in the other rotary direction, as urged by the rider's pressing upon the pedals, as shall be more clearly explained below. In this respect, the central wheel 712 is thus composed of the inner wheel 764 and the outer rim 762 with tire 744. A bolt 765 or other tensioning means may be provided to control the frictional interaction between inner wheel 764 and outer rim 762 as shall be explained further below.

Figure 10:
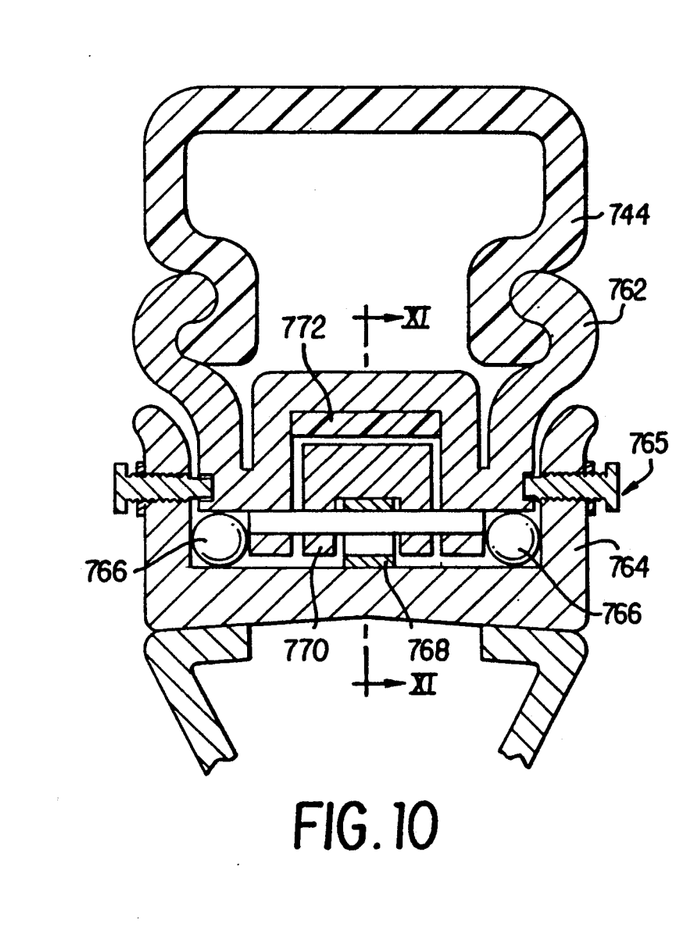
FIG. 10 is a cross-sectional view of the wheel portion of the device shown in FIG. 9 taken along section line X—X and looking in the direction of the arrows.
Figure 11:
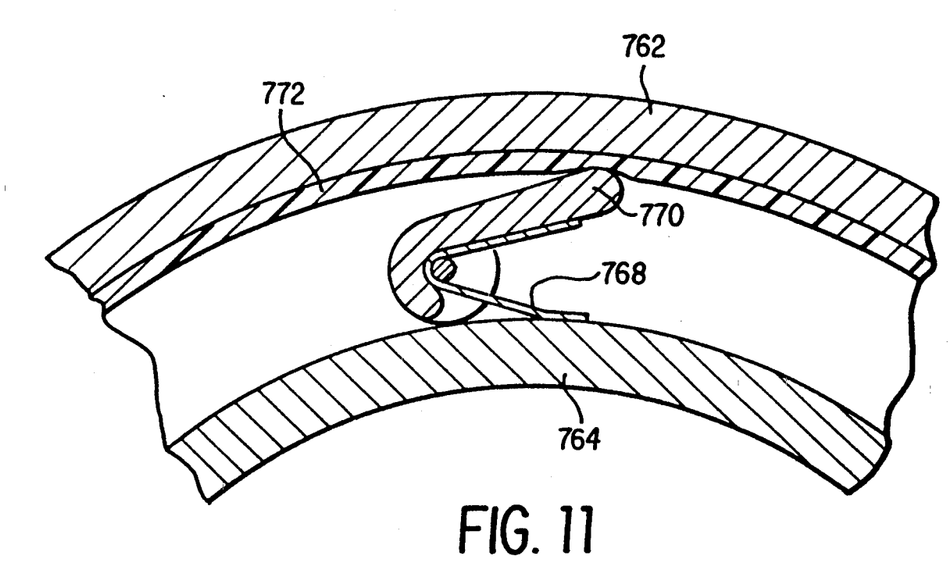
FIG. 11 is a cross-sectional view of the clutch apparatus of the device shown in FIG. 10 taken along section line XI—XI and looking in the direction of the arrows.

FIG. 10 shows a cross-sectional view of a one-way clutch to provide the above described freewheeling/conjoint operation. Ball bearings 766 allow the outer rim 762 to rotate independently about the inner wheel 764. A biasing member 768, such as a leaf spring, urges a pivoting engagement arm 770 into contact with a clutch lining 772 affixed to an inner surface of the rim 762. Referring to FIG. 11 it can be seen that when the rim 762 is rotated clockwise relative to the inner wheel 764, the clutch lining 772 slides over the engagement arm 770. In the reverse direction, however, the engagement arm 770 jams into the clutch lining and causes the rim 762 and inner wheel 764 to rotate as a unit. There are a plurality of such arms 770 disposed around the inner wheel 764. In the alternative, any unidirectional clutch mechanism as is known in the art could be employed. A unidirectional clutch allows the rider to attain a desired speed and pedal position and then coast without pedalling. Thus, the rider can rest or devote his attention to steering. The direction of rotation can be reversed by straddling the unicycle in the other direction, prior to use. The option of coasting adds another significance to the pedal wheels, in that, during coasting, the pedal wheels can be brought into contact with the ground to correct an imbalance condition or to have a steering or braking effect. Friction adjusting bolt 765 passes through inner wheel 764 and presses to a selected degree against outer rim 762 in order to establish a desired frictional interaction therebetween ranging from a coupled state to an independently free wheeling state as suits the preference and skills of the rider.

The present invention therefore provides a stabilized unicycle having a conventional disk-like central wheel which permits a large degree of tilt throughout the majority of the cycle of rotation of the central wheel and thereby enables the cycle to be turned like a traditional unicycle. In addition, the present invention is a unicycle design which reestablishes a predetermined orientation of the central wheel relative to the ground, periodically, during rotation of the center wheel via center wheel tilt limiters which are specially designed and adapted to contact the ground on a periodic basis.

It should be understood that the embodiments described herein are merely exemplary and that a person skilled in the art may make many variations and modifications without departing from the spirit and scope of the invention as defined in the appended claims. For example, a detachable handle or seat could be added to the unicycle as would be known from the prior art. In addition, one could employ known cycle components such as spoked wheels, hubs and crankarms, etc., to fabricate a unicycle within the scope of the present invention and incorporating the novel features and function thereof.

I claim:
1. A unicycle comprising:
 (a) a wheel;
 (b) a first foot support attached to and extending substantially at right angles from one side of said wheel;
 (c) a second foot support attached to and extending substantially at right angles from the opposite side of said wheel in diametric opposition to said first foot support; and
 (d) tilt limiting means associated with each of said first and said second foot supports for intermittently limiting the angle of tilt of said wheel relative to a supporting surface upon which said wheel may roll to a selected angle by contacting said supporting surfaces;
 (e) said tilt limiting means are affixed to each of said foot supports at a free end thereof distal to said wheel; and
 (f) said tilt limiting means are spheric in shape and are rigidly affixed to each of said foot supports.

2. The device of claim 3, wherein said spheric tilt limiting means are removeable from said foot supports and interchangeable with a rotatable member.

3. A unicycle comprising:
(a) a wheel;
(b) a first foot support attached to and extending substantially at right angles from one side of said wheel;
(c) a second foot support attached to and extending substantially at right angles from the opposite side of said wheel in diametric opposition to said first foot support; and
(d) tilt limiting means associated with each of said first and said second foot supports for intermittently limiting the angle of tilt of said wheel relative to a supporting surface upon which said wheel may roll to a selected angle by contacting said supporting surface;
(e) said tilt limiting means are affixed to each of said foot supports at a free end thereof distal to said wheel; and
(f) wherein said tilt limiters are secondary wheels and said secondary wheels are rotatably attached to said foot supports.

4. The device of claim 3, wherein said secondary wheels have a means associated therewith for varying the rotational friction from a maximum friction setting corresponding to a locked condition to a minimum friction setting allowing freewheeling.

5. The device of claim 3, wherein said secondary wheels are removable and interchangeable with alternative secondary wheels of a different size to thereby change the angle of tilt limitation.

6. The device of claim 3, wherein said secondary wheels have a slotted hub to permit said secondary wheels to be positioned at a selected distance form an axis of said wheel and locking means for maintaining said secondary wheels thereat.

7. A unicycle comprising:
(a) a wheel;
(b) a first foot support attached to and extending substantially at right angles form one side of said wheel;
(c) a second foot support attached to and extending substantially at right angles from the opposite side of said wheel in diametric opposition to said first foot support; and
(d) tilt limiting means associated with each of said first and said second foot supports for intermittently limiting the angle of tilt of said wheel relative to a supporting surface upon which said wheel may roll to a selected angle by contacting said supporting surface;
(e) said tilt limiting means are affixed to each of said foot supports at a free end thereof distal to said wheel; and
(f) wherein each of said foot supports are adjustably attached to said wheel permitting said foot supports to be positioned at a selected distance form an axis of said wheel.

8. A unicycle comprising:
(a) a wheel;
(b) a first foot support attached to and extending substantially at right angles form one side of said wheel;
(c) a second foot support attached to and extending substantially at right angles from the opposite side of said wheel in diametric opposition to said first foot support; and
(d) tilt limiting means associated with each of said first and said second foot supports for intermittently limiting the angle of tilt of said wheel relative to a supporting surface upon which said wheel may roll to a selected angle by contacting said supporting surface;
(e) wherein said wheel has a varying width at the outer peripheral surface thereof.

9. A unicycle comprising:
(a) a wheel;
(b) a first foot support attached to and extending substantially at right angles form one side of said wheel;
(c) a second foot support attached to and extending substantially at right angles from the opposite side of said wheel in diametric opposition to said first foot support; and
(d) tilt limiting means associated with each of said first and said second foot supports for intermittently limiting the angle of tilt of said wheel relative to a supporting surface upon which said wheel may roll to a selected angle by contacting said supporting surface;
(e) wherein said wheel includes an inner wheel to which said foot supports are attached and an outer rim independently coaxially rotatable in a first direction and locked into conjoint rotation with said inner wheel in the opposite direction as controlled by a uni-directional clutch.

10. The device of claim 9, further including means for adjusting frictional interaction between said inner wheel and said outer rim, said means for adjusting acting independently of said clutch and irrespective of rotational direction, and variable from a maximum friction setting corresponding to a locked condition to a minimum friction setting allowing freewheeling.

11. A unicycle comprising:
(a) a wheel;
(b) a first foot support attached to and extending substantially at right angles form one side of said wheel;
(c) a second foot support attached to and extending substantially at right angles from the opposite side of said wheel in diametric opposition to said first foot support; and
(d) tilt limiting means associated with each of said first and said second foot supports for intermittently limiting the angle of tilt of said wheel relative to a supporting surface upon which said wheel may roll to a selected angle by contacting said supporting surface;
(e) wherein each of said foot supports are pivotally attached to said wheel to allow said foot supports to be placed into a retracted position and a deployed position.

12. The device of claim 8, wherein said wheel is in the form of an open ring.

13. A unicycle comprising:
(a) a wheel having an outer peripheral surface which contacts a supporting surface upon which said wheel rolls;
(b) a first foot support attached to and extending substantially at right angles from one side of said wheel; and,
(c) a second foot support attached to and extending substantially at right angles from the opposite side of said wheel in diametric opposition to said first foot support, said first and said second foot supports of a size substantially smaller than the wheel, having at least a portion thereof which is coextensive with said wheel at said peripheral surface.

14. The device of claim 13, wherein each of said foot supports is rotatable relative to said wheel.

* * * * *